(12) United States Patent
Bobrov et al.

(10) Patent No.: US 7,001,685 B2
(45) Date of Patent: Feb. 21, 2006

(54) FUEL CELL STACK ASSEMBLY LOAD FRAME WITH COMPRESSION SPRING

(75) Inventors: Larisa S. Bobrov, Penfield, NY (US); Karl J. Haltiner, Jr., Fairport, NY (US); Haskell Simpkins, Grand Blanc, MI (US); Michael T. Faville, Geneseo, NY (US); Sean M. Kelly, Churchville, NY (US); Subhasish Mukerjee, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 337 days.

(21) Appl. No.: 10/357,748

(22) Filed: Feb. 4, 2003

(65) Prior Publication Data

US 2003/0235742 A1 Dec. 25, 2003

Related U.S. Application Data

(60) Provisional application No. 60/391,029, filed on Jun. 24, 2002.

(51) Int. Cl.
*H01M 2/00* (2006.01)
*H01M 2/02* (2006.01)
*H01M 2/14* (2006.01)

(52) U.S. Cl. .............................. 429/34; 429/37; 429/38; 429/30; 429/12

(58) Field of Classification Search ................. 429/34, 429/12, 37, 38, 30
See application file for complete search history.

(56) References Cited

U.S. PATENT DOCUMENTS

| 6,190,793 | B1 * | 2/2001 | Barton et al. ................ 429/34 |
| 2003/0096147 | A1 | 5/2003 | Badding et al. |

FOREIGN PATENT DOCUMENTS

| DE | 100 03 528 A1 | 8/2001 |
| EP | 0936 689 A1 | 8/1999 |
| EP | 0936689 A1 * | 8/1999 |
| WO | 02/19456 A1 | 3/2002 |
| WO | 03/007400 A1 | 1/2003 |

* cited by examiner

*Primary Examiner*—Patrick Joseph Ryan
*Assistant Examiner*—Angela J. Martin
(74) *Attorney, Agent, or Firm*—Paul L. Marshall

(57) ABSTRACT

A load frame with mechanical springs for providing compression to a fuel cell stack during assembly and operation of a fuel cell assembly. The stack assembly load frame includes a base plate for supporting the stack, a moveable spring holder above the stack, a retaining plate above the spring holder, and tubular supports or rods retaining the post-sintered spacing established by the applied load defining the spacing of the base plate from the retaining plate. A spring for maintaining compression in each stack is positioned between the spring holder and the retaining plate. The invention further comprises a method for assembling a fuel cell assembly to provide an adequate compressive load to the stack during assembly and operation.

15 Claims, 4 Drawing Sheets

FUEL CELL STACK ASSEMBLY LOAD FRAME WITH COMPRESSION SPRING

RELATIONSHIP TO OTHER APPLICATIONS

The present application claims priority from U.S. Provisional Patent Application, Ser. No. 60/391,029, filed Jun. 24, 2002.

TECHNICAL FIELD

The present application relates to hydrogen/oxygen fuel cells having a solid-oxide electrolytic layer separating an anode layer from a cathode layer; more particularly, to fuel cell assemblies comprising a plurality of individual fuel cells in a stack wherein air and reformed fuel are supplied to the stack; and most particularly, to a fuel cell stack assembly load frame including a compression spring.

BACKGROUND OF THE INVENTION

Fuel cells which generate electric current by controllably combining elemental hydrogen and oxygen are well known. In one form of such a fuel cell, an anodic layer and a cathodic layer are separated by a ceramic solid oxide electrolyte known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode. Each $O_2$ molecule is split and reduced to two $O^{-2}$ anions catalytically by the cathode. The oxygen anions diffuse through the electrolyte and combine at the anode/electrolyte interface with four hydrogen ions to form two molecules of water. The anode and the cathode are connected externally through a load to complete the circuit whereby four electrons are transferred from the anode to the cathode. When hydrogen is derived by "reforming" hydrocarbons such as gasoline in the presence of limited oxygen, the "reformate" gas includes CO which is converted to $CO_2$ at the anode. Reformed gasoline is a commonly used fuel in automotive fuel cell applications.

A single cell generates a relatively small voltage and wattage, typically about 0.5 volt to about 1.0 volt, depending upon load, and less than about 2 watts per $cm^2$ of cell surface. In practice, a plurality of cell modules are stacked and put into electrical series to meet volume and power requirements. The modules are separated by perimeter spacers whose thickness is selected to permit flow of gas to the anodes and cathodes as required and which are sealed axially to prevent gas leakage from the sides of the stack. The perimeter spacers may include dielectric layers to insulate the interconnects from each other. Adjacent modules are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load. Typically, most or all of the planar elements in a stack are sealed to adjacent elements along their mating faces by seals which are formed of glass or other brittle materials. These materials can form excellent seals, especially at the high operating temperatures required for an SOFC; however, the seals must be sintered during assembly to cause the materials to be compressed and to flow into micro-irregularities in the surfaces to be sealed.

During assembly of the fuel stacks, a compressive load must be maintained during sintering of the stack assembly seals. This compressive load must then be maintained after the sintering process and during mounting of the assembly to the manifold at room temperature to ensure the integrity of the glass seals between the stack's components. During use of the assembled fuel cell system, components of the stack can change dimensions due to thermal expansion, which can place unacceptable stresses on the stack seals and which can cause mismatches in the heights of adjacent stacks.

What is needed is a means for providing a permanent and resilient compressive load to the stack during and after assembly to ensure the integrity of the glass seals between stack components at all times in the stack life.

BRIEF DESCRIPTION OF THE INVENTION

Briefly described, in a solid-oxide fuel cell assembly a load frame with mechanical springs provides compression to the stacks during assembly and operation. A stack assembly load frame includes a base plate for supporting the stack, a moveable spring holder above the stack, a retaining plate above the spring holder, and tubular supports or rods retaining the post-sintered spacing established by the applied load defining the spacing of the base plate from the retaining plate. A mechanical spring for maintaining compression in each stack is positioned between the spring holder and the retaining plate. The invention further comprises a method for assembling a fuel cell to provide an adequate compressive load to the stack during assembly and operation.

An advantage of the present apparatus is that it insures the integrity of the glass seals between the stack cell modules during assembly.

Another advantage of the present apparatus is that it compensates for the mismatch in the height of multiple stacks in a multi-stack assembly.

BRIEF DESCRIPTION OF THE DRAWINGS

These and other features and advantages of the invention will be more fully understood and appreciated from the following description of certain exemplary embodiments of the invention taken together with the accompanying drawings, in which.

DETAILED DESCRIPTION OF THE INVENTION

Figure 1:
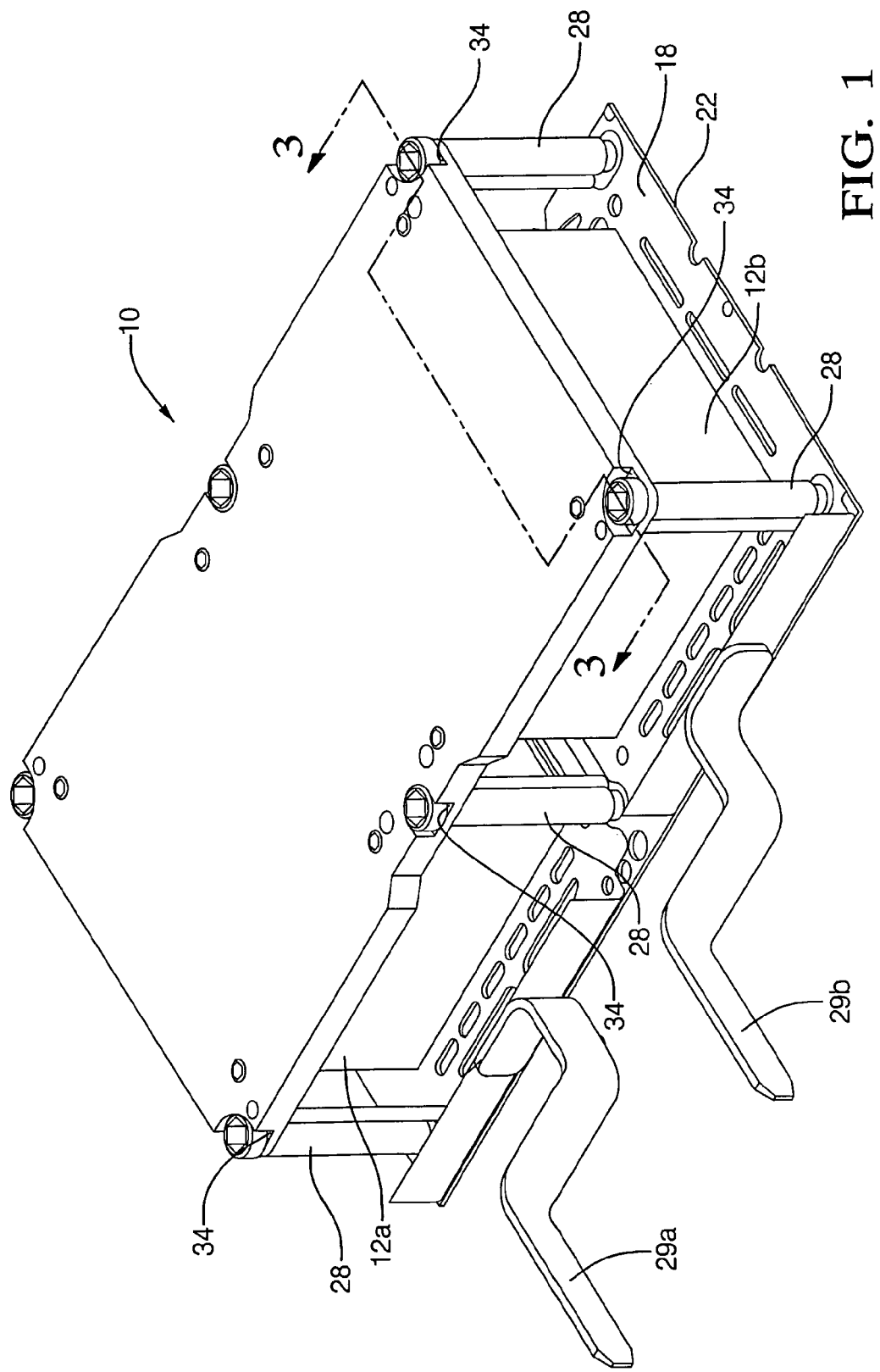
FIG. 1 is an isometric view from above of a two-stack fuel cell assembly, showing elements of a stack assembly load frame.

Referring now to FIGS. 1 through 4, fuel cell assemblies 10, 10', in accordance with the invention, include two fuel cell stacks 12a, 12b, each stack comprising a plurality of individual fuel cell modules 14 arranged in electrical series. Of course, the invention is useful in combination with as few as a single stack. Stacks 12a, 12b are connected in series at an upper end by interconnect 16, and at a lower end by current collector 18. A stack assembly load frame 20 includes a base plate 22 for supporting the stack assembly, a moveable spring holder 24 above each stack, a retaining plate 26 above the spring holders, and a plurality of tubular spacer supports 28 or rods 28' which retain the post-sintered spacing established by the applied load defining the spacing of the base plate 22 from the retaining plate 26 and attached thereto as described below. Also shown are power leads 29a, 29b connected to current collector 18.

Figure 3:
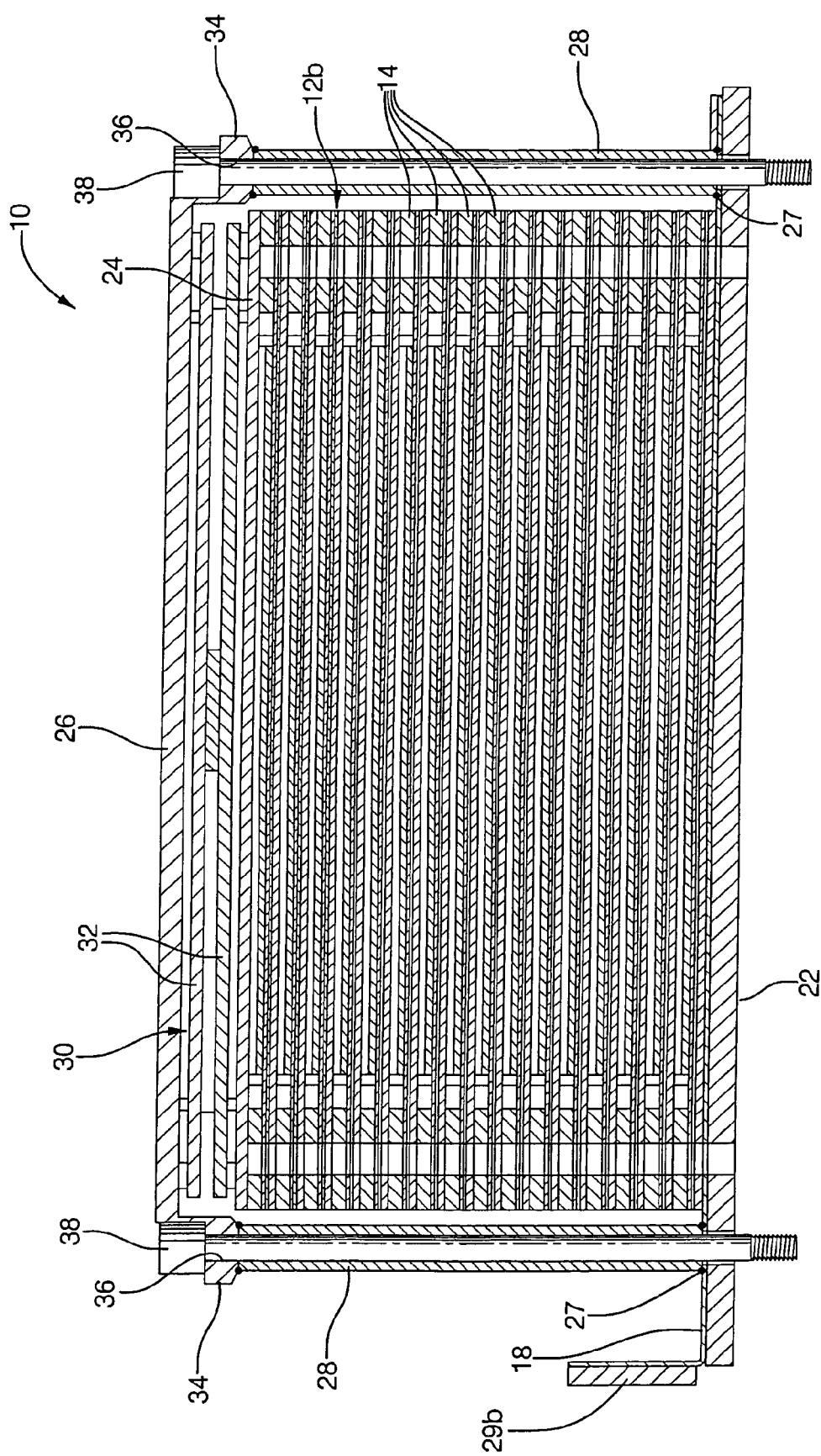
FIG. 3 is an elevational cross-sectional view through the fuel cell assembly taken along line 3—3 in FIG. 1.

Referring to FIG. 3 in which fuel cell assembly 10 is shown, a mechanical spring 30 comprising leaves 32 for maintaining compression in each stack 12a, 12b is positioned between each spring holder 24 and retaining plate 26. Corners and side portions of plate 26 are formed as ears 34 having bores 36 for receiving bolts 38 for assembling the stack assembly to a supply/exhaust manifold (not shown). Support tubes 28 are centered on bores 36 such that bolts 38 are passed through tubes 28 during assembly.

The operative compressive load on the stacks is provided by the mechanical springs 30. Displacement of springs 30 provides acceptable compression load despite differences in thermal growth between stack components at temperatures ranging from room temperature to operating (700–800° C.). In addition, springs 30 absorb differences in the heights of stacks 12a, 12b due to assembly tolerances.

The initial pre-load on the springs 30 is set by the length of the tubes 28, which may be a fixed pre-determined length or adjustable to the desired length.

Figure 2:
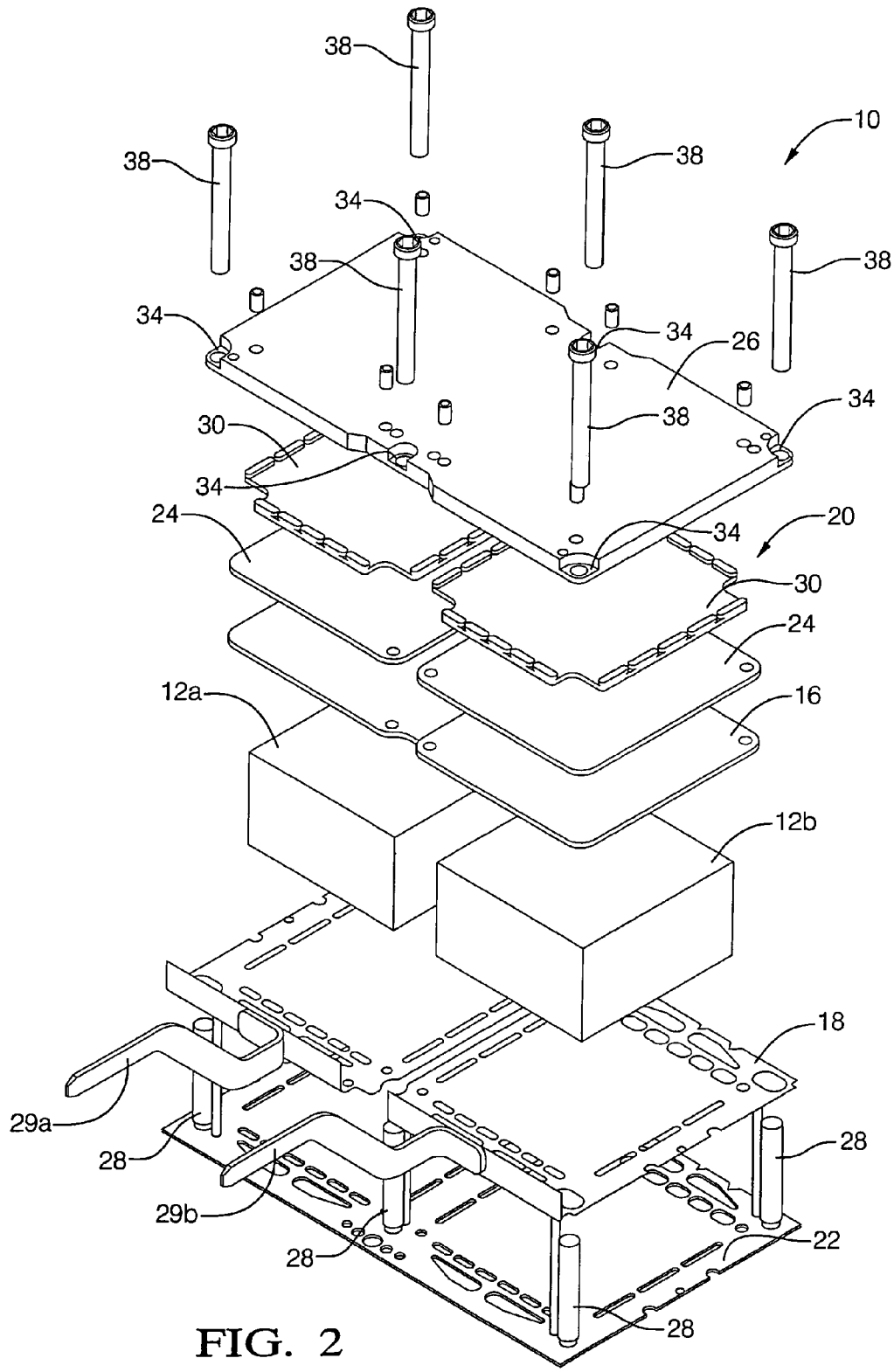
FIG. 2 is an exploded isometric view from above of the fuel cell assembly shown in FIG. 1.

To assemble assembly 10 in accordance with the invention shown in FIG. 3, modules 14 are stacked together to form stacks 12a, 12b and are placed side-by-side on current collector 18 which is mounted onto base plate 22. Preferably, tubular spacer supports 28 are prewelded 27 onto base plate 22 concentric with bores therein for later passage of bolts 38, as shown in FIG. 3. Interconnect 16 is placed onto stacks 12a, 12b. Spring holders 24 are placed on interconnect 16, springs 30 are placed on spring holders 24, and retaining plate 26 is placed on springs 30, as shown in FIG. 2. The resulting sub-assembly is placed in a compressive jig (not shown), and the jig-mounted sub-assembly is placed in an oven for sintering of glass seals within the stacks. During the sintering process, which may be carried out for a predetermined length of time at, for example, 800° C.–1000° C., an external load is applied to the sub-assembly. After the sintering process, while the sub-assembly is still hot and still compressed by the jig, tubular spacer supports 28 are fixed to retaining plate 26 as by tack welding or a fastener to pre-load springs 30 and thereby apply a residual compressive load to stacks 12a, 12b when the jig is removed and the sub-assembly cooled. The sub-assembly is then ready for subsequent mounting via bolts 38 to a system manifold (not shown).

Figure 4:
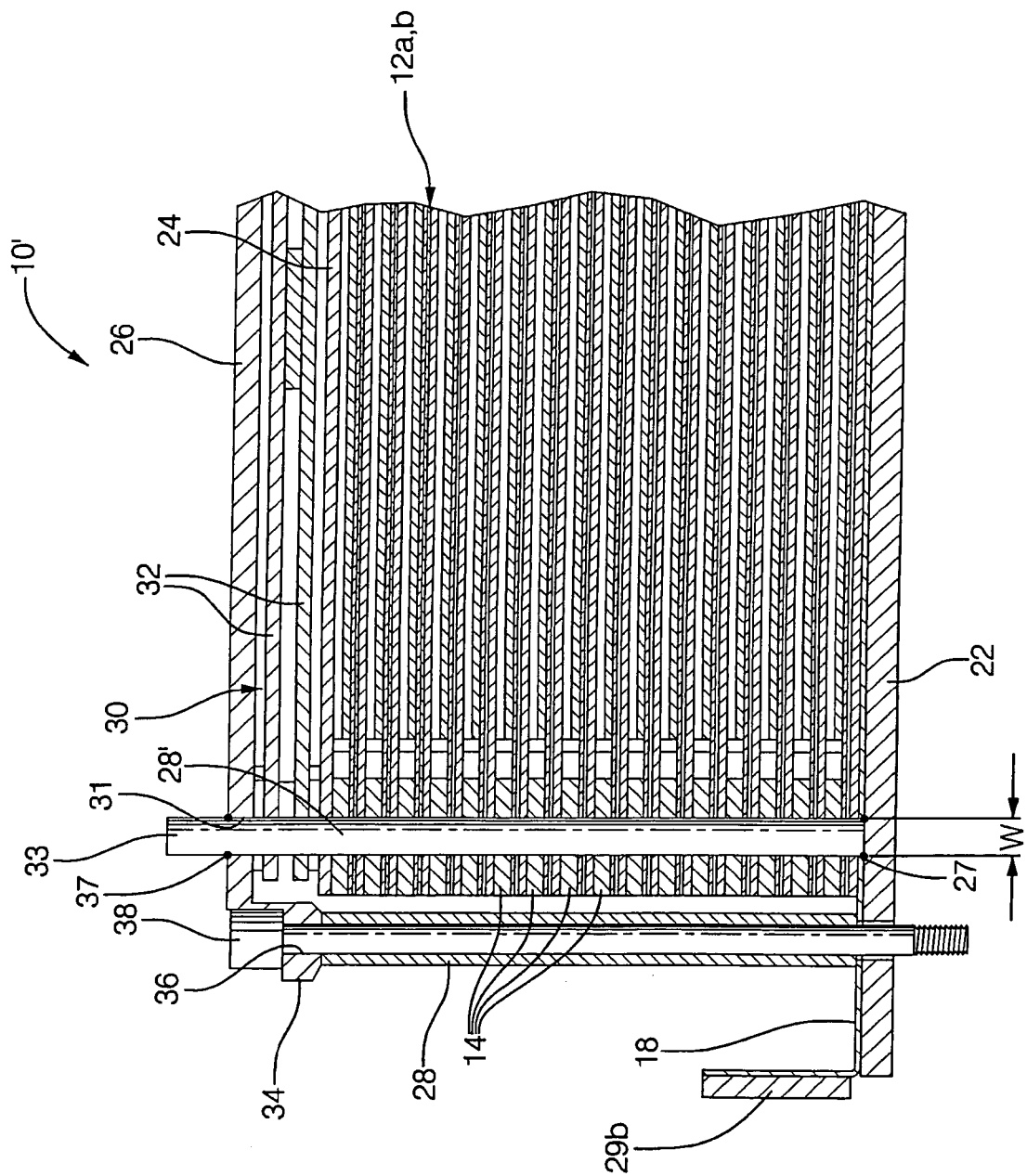
FIG. 4 is a partial elevational cross-sectional view through the fuel cell assembly, similar to the view of FIG. 3, but showing an alternate embodiment.

A second embodiment of the invention is shown as fuel cell assembly 10' in FIG. 4. Similar to the embodiment shown in FIG. 3, a mechanical spring 30 comprising leaves 32 for maintaining compression in each fuel cell stack is positioned between each spring holder 24 and retaining plate 26. However, unique to this embodiment, portions of plate 26 that extend outside the periphery of stacks 12a and b include apertures 31. Ends 33 of rods 28', for setting the compressive load on the stack, are loosely received in apertures 31. The operative compressive load on the stacks is provided by the mechanical springs 30. In addition, springs 30 absorb differences in the heights of stacks 12a, 12b due to assembly tolerances. While the cross-section width of rods 28' is shown as W for clarity purposes, it shown be noted that width W needs only to be sufficient to apply a compressive load to mechanical springs 30.

Referring again to FIG. 4, the initial pre-load on the springs 30 is set by rods 28' as follows. As in the embodiment shown in FIG. 3, modules 14 are stacked together to form stacks 12a, 12b and are placed side-by-side on current collector 18 which is mounted onto base plate 22. A plurality of rods 28' (one shown) are preferably prewelded 27 onto base plate 22 and oriented generally parallel with bolts 38. Interconnect 16 is placed onto stacks 12a, 12b. Spring holders 24 are placed on interconnect 16, and springs 30 are placed on spring holders 24. Retaining plate 26 is then placed on springs 30 with ends 33 of rods 28' protruding through plate orifices 31. The resulting sub-assembly is placed in a compressive jig (not shown) where a known compressive force is applied to control parallelism between base plate 22 and retaining plate 26 after which the sintering process is carried out. After the sintering process, and while the stacks are still compressed in the jig, rods 28' are clipped close to the upper surface of plate 26 as shown by dotted line 35. Rods 28' are fixed to retaining plate 26 as by tack welding 37 and thereby apply a residual compressive load to stacks 12a, 12b when the jig is removed. The sub-assembly is then ready for subsequent mounting to a system manifold (not shown), via, for example, bolts 38.

While the above description discloses a particular type of spring and location, any spring means that applies a compressive load to the stacks is comprehended by the invention.

The present application can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A load frame assembly for providing a permanent compressive load to a fuel cell stack in a fuel cell assembly, comprising:
   a) a base plate for receiving said fuel cell stack on one end thereof;
   b) a spring holder for applying said load to an opposite end of said fuel cell stack;
   c) a spring disposed against said spring holder;
   d) a retainer plate for retaining said spring against said spring holder, said spring being positioned between said spring holder and said retainer plate; and
   e) at least one tubular spacer support disposed between said base plate and said retainer plate and having a length such that attaching said at least one tubular spacer support to said base plate and said retainer plate places said spring, said spring holder, and said fuel cell stack in compression.

2. A load frame assembly in accordance with claim 1 wherein said spring is a mechanical spring.

3. A load frame assembly in accordance with claim 2 wherein said mechanical spring is a leaf spring.

4. A load frame assembly in accordance with claim 1 wherein said at least one tubular spacer support is attached to said base plate and said retainer plate by welding.

5. A fuel cell assembly comprising:
   a) at least one fuel cell stack; and b) a load frame assembly disposed around said stack for applying compressional force to said stack, wherein said load frame assembly comprises:
   a base plate for receiving said fuel cell stack on one end thereof;
   a spring holder for applying said load to an opposite end of said fuel cell stack;
   a spring disposed against said spring holder;
   a retainer plate for retaining said spring against said spring holder; and
   at least one tubular support disposed between said base plate and said retainer plate and having a length such that attaching said at least one tubular support to said base plate and said retainer plate places said spring, said spring holder, and said fuel cell stack in compression.

6. A method for applying a permanent compressive load to a fuel cell stack, comprising the steps of:
   a) providing a base plate;
   b) disposing said fuel cell stack on said base plate;
   c) overlaying said fuel cell stack with a spring holder;
   d) overlaying said spring holder with a spring;
   e) overlaying said spring with a spring retainer;
   f) compressing said fuel cell stack between said base plate and said spring retainer;
   g) sintering said compressed fuel cell stack at a predetermined temperature for a predetermined length of time;
   h) providing a spacer; and
   i) rigidly attaching said spacer between said base plate and said spring retainer while said fuel cell stack is still being compressed and still hot from said sintering to hold said compression of said sintered fuel cell stack.

7. A method in accordance with claim 6 wherein said compressing step includes compressing said fuel cell stack between said base plate and said spring retainer to a predetermined displacement.

8. A method in accordance with claim 6 wherein said compressing step includes compressing said fuel cell stack between said base plate and said spring retainer to a predetermined compressive force.

9. A method in accordance with claim 6 wherein said predetermined sintering temperature is greater than about 800° C.

10. A method in accordance with claim 6 wherein said spacer is at least one rod and said rigidly attaching step includes receiving an end of said at least one rod in a respective aperture in said spring retainer.

11. A method in accordance with claim 10 wherein, after said end is received in said aperture, said at least one rod is rigidly attached to said spring retainer means by welding.

12. A load frame assembly in accordance with claim 1 further including a bolt positioned in said at least one tubular spacer support adapted to couple the load frame assembly to a manifold.

13. A load frame assembly for providing a permanent compressive load to a fuel cell stack in a fuel cell assembly, comprising:
   a) a base plate for receiving said full cell stack on one end thereof;
   b) a spring holder for applying said load to an opposite end of said fuel cell stack;
   c) a spring disposed against said spring holder;
   d) a retainer plate for retaining said spring against said spring holder, said spring being positioned between said spring holder and said retainer plate;
   e) at least one spacer support disposed between said base plate and said retainer plate and having a length such that attaching said at least one spacer support to said base and said retainer places said spring, said spring holder, and said fuel cell stack in compression, wherein said at least one spacer support is coupled to at least one of said base plate and said retainer plate by a welded connection.

14. A load frame assembly in accordance with claim 13 wherein said spacer support is a tubular spacer support.

15. A load frame assembly in accordance with claim 14 wherein said spacer support is a rod.

* * * * *